July 21, 1942.   W. J. DEGNEN ET AL   2,290,580
METHOD FOR CONVERTING HYDROCARBON OILS
Filed April 2, 1938
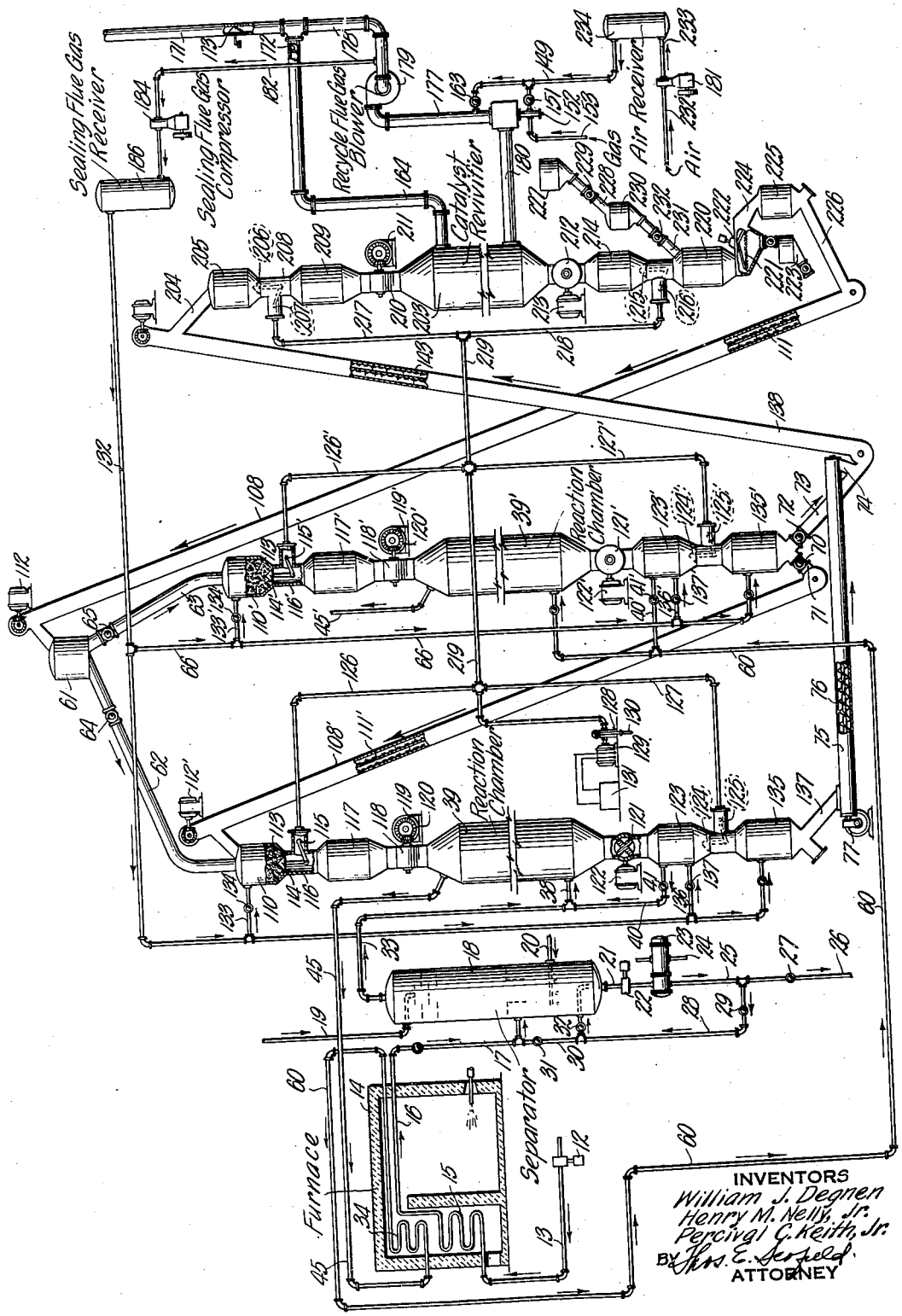

Patented July 21, 1942

2,290,580

UNITED STATES PATENT OFFICE 2,290,580

METHOD FOR CONVERTING HYDROCARBON OILS

William J. Degnen, Cranford, Henry M. Nelly, Jr., Jersey City, and Percival C. Keith, Jr., Peapack, N. J., assignors to The M. W. Kellogg Company, New York, N. Y., a corporation of Delaware Application April 2, 1938, Serial No. 199,703

13 Claims. (Cl. 196—49)

Our invention relates to a method for converting hydrocarbon oils, and more particularly to a method for converting high boiling hydrocarbons into low boiling hydrocarbons in the presence of a catalyst.

This application is an improvement of our co-pending application, Serial No. 199,702, filed April 2, 1938.

The catalytic cracking of hydrocarbon oils is known to the art. In general, the methods of the prior art consist in heating hydrocarbon oil to cracking temperatures and passing highly heated oil or its vapors through a cracking zone in the presence of a suitable catalyst in order to convert the hydrocarbon oil into the desired products. For various reasons, the catalyst becomes less effective with use and it is necessary to revivify it. During an operation, the catalyst varies in effectiveness from maximum to minimum so that, for any given catalyst bed, only average effectiveness is obtained.

Cracking is an endothermic reaction, and oil heated to cracking temperature and passed into a cracking zone will, as the reaction progresses, cool, and with cooling there is a progressive decrease in the cracking reaction until no cracking occurs. In our above mentioned co-pending application, Serial No. 199,702, we have provided means for supplying heat to the reaction chamber during the cracking reaction in order to increase the amount of cracking per pass. In the instant application, we propose to divide the catalytic bed or reaction chamber into a plurality of stages so that the partially cracked material may be heated between stages.

One object of our invention is to provide a method of cracking in the presence of a catalyst, in which the catalyst material is continuously being removed and revivified, in a plurality of beds with an intermediate step of heating.

Another object of our invention is to provide a method of cracking in the presence of a catalyst in which the catalytic bed is continuously being removed and revivified so that the catalytic bed will remain of substantially constant effectiveness.

Other and further objects of our invention will appear from the following description.

In the accompanying drawing, which forms part of the instant specification, and which is to be read in conjunction therewith, the figure is a schematic view of apparatus capable of carrying out the process of our invention.

In general, our invention contemplates a process in which oil vapors to be converted are brought into contact with a catalyst in a first conversion zone in which the catalyst is continuously being replaced so that the composition of the oil vapor leaving the catalyst chamber will be substantially constant and may flow to heating equipment without precautions being taken for change in its composition, and then to a second reaction chamber in which the catalyst is likewise continuously being maintained at a constant state of activity, so that the cracking vapors may flow to after equipment without constantly watching for changes in its composition, and the necessity of varying the operation of the after equipment. This is a major advantage over the prior art in which intermittent processes of the prior art in which the products leaving the catalyst chamber may vary in composition. In an intermittent process, for example, in which hydrocarbon oils are cracked to form gasoline-like hydrocarbons, at the beginning of a period the vapors leaving the reaction chamber may contain from 40% to 50% of gasoline, while, at the end of the period, they may contain as low as 15% to 20% of gasoline.

In the intermittent processes in order to obtain high cracking per pass, the cracking period must necessarily be short due to the fact that the catalyst activity falls off rapidly. In a continuous process, the cracking per pass may be raised by increasing the circulation rate of the catalyst per unit of oil charged.

In the intermittent processes, the oil vapors to be converted pass through the reaction chamber in contact with catalyst of highest activity only during one part of a period. After this period has been passed the catalyst is progressively decreasing in activity. In our method of continuously circulating a catalyst in contact with the oil vapors, the average composition of the catalyst remains substantially constant and a portion of the oil vapors always contacts some catalyst of highest activity.

The catalyst being continuously removed from the reaction chamber is continuously revivified and recirculated to the catalyst chamber.

By splitting the reaction into two stages and supplying heat to the material during each of the stages, the drop in temperature with resultant decrease in cracking is minimized.

More particularly, referring now to the drawing, the oil to be cracked, which may be of any suitable character, such as gas oil or the like, is pumped through pipe 13 by pump 12, through convection heating coil 15 in furnace 14, through radiantly heated tubes 16, the oil being withdrawn from the furnace through transfer pipe 17 for passage into the separator 18, into which it is separated into vapors and unvaporized oil. A control reflux may be introduced into the separator 18 through pipe 19. Superheated steam may be delivered into separator 18 through pipe 20 to assist in the separation of the vapors from the heated oil. The unvaporized oil is withdrawn from the separator 18 through pipe 21 and pumped by pump 22 to heat exchanger 23, which is supplied with a cooling medium through pipe 24. The cooled unvaporized oil leaves the cooler 23 through pipe 25 and may be passed through pipe 26, controlled by valve 27, to storage. A portion of the cooled unvaporized oil may be returned to the separator through pipe 28, controlled by valve 29, from whence it may be delivered through pipe 30, controlled by valve 31, into contact with the highly heated charging stock to control its temperature. A portion of the unvaporized oil may be recycled for tower bottoms fluxing by opening valve 32. The highly heated oil vapors are withdrawn from the separator 18 through a pipe 33 and passed through pipe 38 for introduction into the base of the reaction chamber 39. The cracked vapors are withdrawn from the reaction chamber through pipe 45 and are heated in coil 34 of furnace 14. The reheated partially converted vapors are withdrawn from the furnace 14 through pipe 60 and pass into the base of reaction chamber 39'. The converted vapors leave the reaction chamber through line 45' and pass to the usual after treatment, including dephlegmation and condensation, for recovery of the converted hydrocarbons.

In the reaction chambers 39 and 39', the heated vapors react to form lighter hydrocarbons in the presence of a catalyst. The catalyst in our method is of a nature so that it can be fed to and withdrawn from reaction chambers continuously. The fresh catalyst, which may be used catalytic material which has been revivified, is fed through a conveyor duct 108 to a catalyst distributing bin 61. From the catalyst distributing bin 61 the catalytic material may flow through conduits 62 and 63 controlled by respective valves 64 and 65. The conveyor duct 108 is provided with any suitable conveying means 111 driven by a suitable prime mover such as electric motor 112. Catalytic material from the distributing bin 61 is adapted to flow into a catalytic feeding hopper 110' through duct 63. Similarly, catalyst material from distributing bin 61 may flow through conduit 62 if valve 64 be opened, into catalyst feeding hopper 110. The feeding of catalyst material 113 from the hoppers 110 and 110' is controlled by respective cone type valves 114 and 114', each provided with hydraulic operating means 115 and 115'. The catalyst material passes from respective feeding hoppers 110 and 110' through ducts 116 and 116' into respective sealing hoppers 117 and 117'. The catalyst material is fed from the sealing hopper 117 into the reaction chamber 39 by a rotary bucket type valve 118, operated by an electric motor 119 through suitable gears 120. Similarly, catalyst material from sealing hopper 117' is fed to the reaction chamber 39' through a rotary bucket type valve 118' operated by an electric motor 119, through suitable gears 120'.

The used catalytic material is withdrawn from the reaction chamber 39 by rotary bucket type valve 121 operated by an electric motor 122. In the same manner, used catalytic material leaves the reaction chamber 39' through a rotary bucket type valve 121' operated by an electric motor 122'. The motors 119, 119', 122 and 122' may be synchronized so that the rate of feeding and the rate of withdrawal are kept the same. The used catalytic material leaving reaction chamber 39 via valve 121, passes into a sealing hopper 123, the exhaust of which is controlled by a cone type valve 124, operated by a hydraulic operating mechanism 125. In the same manner, catalytic material leaving the reaction chamber 39' via valve 121' passes into a sealing hopper 123', the exhaust of which is controlled by a cone type valve 124' operated by a hydraulic operating mechanism 125'.

The hydraulic operating mechanisms 115, 115', 125 and 125', are supplied with hydraulic fluid through pipes 126, 126', 127 and 127', respectively. A fluid pump 128 operated by an electric motor 129 supplies fluid from a pipe 130 for the functioning of the hydraulic operating mechanisms. A timing control mechanism 131 of any suitable type known to the art, controls electric motor 129, so that the cone type valves 114, 114', 124 and 124', are intermittently operated to introduce fresh catalytic material into the sealing hoppers 117 and 117', and to withdraw used catalytic material from the sealing hoppers 123 and 123'.

An inert gas, such as flue gas, carbon dioxide, or light hydrocarbon gases under suitable pressure and at a suitable temperature, is introduced into manifold 132. A pipe 133 controlled by a valve 134 permits gas from the manifold 132 to flow into the feeding hopper 110. Likewise, gas from the manifold 132 may pass through pipe 66 into pipe 133' controlled by valve 134' for introduction into the feeding hopper 110'. The pressure of the gas is such that it is slightly in excess of the pressure existing in the catalyst chambers 39 and 39'. The placing of the feeding hoppers 110 and 110' and the communicating sealing hoppers 117 and 117' under this pressure will effectively prevent leakage outwardly of cracked vapors. Such leakage as will occur past cone type valves 114 and 114' will be of the sealing gas into the sealing hoppers 117 and 117'. The capacity of the sealing hoppers is sufficiently greater than the discharge hoppers 135 and 135' that there will always be a quantity of material present in the sealing hoppers 117 and 117', thus assuring continuity of feed to the revivifier. The pressure in feeding hoppers 110 and 110' may be readily controlled by valves 134 and 134', which may be automatically controlled by suitable differential pressure controller known to the art (not shown), placed between the sealing hopper 110 and the reaction chamber 39, and between sealing hopper 110' and reaction chamber 39'. Sealing gas from manifold 132 is also introduced through pipe 136 controlled by valve 137, into discharge sealing hopper 123. By controlling valve 137 the pressure within the hopper 123 is controlled to be slightly in excess of that which exists in pipe 38, and in the reaction chamber 39, so that gas introduced into the sealing hopper 123 will denude or strip the catalytic material discharged with vapors which are carried, either absorbed in the catalytic material or physically mixed in the mass. The stripped vapors and sealing gas will leave the sealing hopper 123 through a pipe 40 controlled by a valve 41, and pass through pipe 38 into the reaction chamber along with the hot vapors to be reacted.

Correspondingly, sealing gas from manifold 132 passes through pipe 66 through pipe 136', controlled by valve 137' into discharge sealing hopper 23'. By control of valve 137, the pressure within hopper 123' is controlled to be slightly in excess of that which exists in pipe 60 and in the reaction chamber 39' so that gas introduced into the sealing hopper 123 will strip the catalytic material of vapors absorbed or mixed therewith. The stripped vapors and sealing gas will leave the sealing hopper 123' through a pipe 40' controlled by valve 41' and pass through pipe 60 into reaction chamber along with the hot vapors to be reacted.

The catalytic reaction chambers 39 and 39' may be operated with the catalyst feed in parallel or in series. When the operation is in parallel, both valves 64 and 65 are opened so that catalytic material from the catalyst distributing bin 61 will flow through conduits 62 and 63 into catalyst feeding hoppers 110 and 110'. The motor 112' operating the conveyor 111' in the conveying tube 108' is stopped. The valve 70 controlling the duct 71 leading to the conveyor tube 111' is closed. The valve 72 controlling the conduit 73 leading to the hopper 74 is opened. Catalytic material discharged into the catalytic material discharge hopper 135 passes through the duct 137 into the conveyor tube 75 for feeding by conveyor screw 76, which is operated by motor 77, into the hopper 74. Catalytic material from hopper 74 is fed through conveyor tube 138 by conveyor 143 to a catalyst revivifying feeding hopper 205 through a duct 204. The catalytic material discharged from catalytic material discharge hopper 135' passes through duct 73 into hopper 74 with the used catalytic material being discharged thereinto by conveyor screw 76.

When the reaction chambers 39 and 39' are operated with the catalyst feed in series, valve 64 is closed while valve 65 is left open. Valve 72 controlling duct 73 is closed, while valve 70 controlling duct 71 is opened. The motor 112' controlling conveyor 111' for operation in conveyor tube 108' is started. Fresh catalytic material from the catalytic material distributing bin 61 is fed to feeding hopper 110' as before. The discharged catalytic material from catalytic discharge hopper 135' is conveyed by conveyor 111' to the catalyst feeding hopper 110. The used catalytic material is discharged from the catalytic material discharge hopper 135 through duct 137, for passage into the conveyor tube 75, as before. It will be seen that in the series operation the flow of vapors is countercurrent to the flow of catalytic material. The counterflow also holds for each chamber in the parallel operation but the counterflow is half the length of that which obtains in the series operation. In both operations there is a withdrawal of the vapors from the first reaction chamber with reheating before passage into the second reaction chamber.

The pressure of the sealing gas in the discharge hoppers 135 and 135' exists in the conveyor tube 75, the hopper 74, as well as in the feeding 138 and the duct 204, as well as in the feeding hopper 205 which feeds the used catalytic material to the catalytic revivifying chamber 203.

The feeding hopper 205 is provided with a cone type valve 206 actuated by hydraulic operating mechanism 207. A duct 208 connects the feeding hopper 205 with the sealing hopper 209. A rotary bucket type valve 210 is operated by motor 211 for passing the catalytic material to be revivified into the revivifying chamber 203. The revivified catalytic material is withdrawn from the revivifying chamber 203 by bucket type valve 212 operated by an electric motor 213, for passage into sealing hopper 214. The revivified catalytic material leaves hopper 214 past a cone type valve 215. The cone type valve 215 is provided with hydraulic operating mechanism 216. The hydraulic operating mechanisms 207 and 216 are supplied with hydraulic operating fluid through pipes 217 and 218 which are in turn supplied through pipe 219 by pump 128. It will be observed that the six hydraulic operating mechanisms, that is, mechanisms 115, 115', 125, 125', 207 and 216 are interconnected so that the revivifying operation and cracking operation are synchronized to continuously supply catalyst and revivify it for reuse. In other words, the catalyst material is continuously passed from the revivifier to the reaction chamber, back to the revivifier in a continuous circulating ring thereby providing for the circulation of the catalyst at an elevated temperature throughout the process, and the hot vapors to be cracked are continuously passed in contact with the moving stream of catalytic material. The revivified catalytic material from sealing chamber 214 passes the cone type valve 215 for delivery into discharge hopper 220.

A vibrating screen 221 provided with vibratory actuating means 222 screens out the fines which pass into a fines collecting hopper 223. The revivified screened catalytic material passes through duct 224 into a hopper 225 from which it is withdrawn through duct 226 for passage to the feeding conveyor tube 108, for carriage by conveying means 111 to the catalyst distributing bin 61. Fresh catalytic material to replace the fines is supplied from hopper 227 through duct 228 controlled by valve 229, and auxiliary hopper 230 and duct 231, which is controlled by valve 232. It will be noted that the catalytic revivifier is under pressure, and the auxiliary hopper 230 acts as a lock. In other words, by operating valve 229, catalytic material is fed from hopper 227 to the auxiliary hopper 230. Valve 229 is then closed and valve 232 is opened, permitting material to pass through duct 231 into the revivified catalytic material discharge hopper 220.

The revivification of the catalytic material in the revivifier chamber 203 is by oxidation of the carbon and adsorbed heavy hydrocarbons. Air is taken from the atmosphere through air intake pipe 232' and is compressed by compressor 181 and delivered through 233 to an air receiver tank 234 which supplies air through pipe 149.

In starting the unit, the valve 151 is opened to supply air to the burner 152, to which fuel gas is supplied through pipe 153, the hot gases passing through duct 180 into the revivifying chamber 203. After the chamber is sufficiently heated, valve 151 is closed and valve 163 is opened to permit air to pass through duct 180 into the revivifying chamber.

The gases of combustion from the revivification reaction are withdrawn from the revivifying chamber 203 through a duct 164 for passage to a flue 171 by opening dampers 172 and 173. A blower 179 is adapted to withdraw flue gas through duct 179 for delivery through duct 177 into duct 180 to the revivifying chamber for controlling the temperature of the revivification reaction. Preferably in duct 178 is interposed any type of cooler such as a waste heat boiler to reduce the gases to the desired temperature.

Flue gas is withdrawn from duct 178 through pipe 182 for compression by compressor 184 and delivery to the sealing flue gas receiver 186. The sealing flue gas receiver 186 supplies sealing gas to manifold 132.

In operating our process, the reaction temperature maintained within the catalyst bed may vary from 800° F. to 950° F. The catalytic material employed may be any suitable material as, for example, alumina deposited upon silica gel. The catalyst may pass through the reaction chambers at a space velocity of from two to ten or more barrels per hour of charge per ton of catalyst material in the bed depending on the desired crack per pass.

It is found that the gasoline yield will be anywhere from ten to twenty per cent or more greater than that which will take place in a run under similar conditions made with a stationary catalyst bed. It is understood, of course, that conditions may be varied within wide limits depending upon the type of hydrocarbon oil being charged and the end products desired.

As the catalyst material becomes contaminated, it loses its activity. We have found that it is not necessary to completely renew the contaminating material to reactivate the catalyst. For example, where the total carbon absorbed in one run amounted to 17% by weight of the catalyst, it was found that a reduction of the carbon by burning in the revivifying chamber to 7.2% by weight of the catalyst gave a catalytic material which was effectively used and compared favorably with an operation in which fresh catalyst was continuously charged.

It is believed from the foregoing that our method will be clear to those skilled in the art. The operation will be understood from the foregoing description. It will be seen that we have accomplished the objects of our invention. We have provided a method of catalytic cracking in which the composition of the oil vapor leaving the catalyst chamber is substantially constant. This enables us to heat the vapors leaving the first reaction stage and to pass the cracked vapors leaving the final reaction stage without special precautions being taken for a change in its composition. This is not true in the intermittent process in which fresh catalyst material beds are operated at progressively decreasing activity due to the continuous decrease in activity of the catalyst as the reaction proceeds.

In the intermittent process it is not uncommon to have a gasoline content in the vapors leaving the reaction chamber at the beginning of the operation of from 40% to 50%, and a gasoline content of as low as 15% to 20% at the end of the cycle.

In a copending application, Serial No. 199,702, there is shown a method of supplying the heat of reaction to individual reaction chambers by circulation of a heating medium around the catalyst passing through the chambers, and in indirect heat exchange therewith. There is also shown a simple chamber wherein the heat of reaction is supplied by the sensible heat of the oil vapors entering. In the present disclosure, excessive preheating of the vapors is avoided by a series of chambers with intermediate stages of heating.

Although the apparatus has been described in connection with a process operated under pressure conditions slightly above atmospheric, it may as well be operated at atmospheric pressure or under sub-atmospheric or vacuum conditions.

While a catalytic cracking process has been described as particularly adapted to the apparatus, it is also suited to other endothermic catalytic reactions such as dehydrogenation of hydrocarbon oils and gases. To adapt the apparatus to exothermic reactions such as catalytic polymerization or synthesis reactions, provision would be made for removing excess heat produced during the reactions.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A process of converting hydrocarbon oils into lower boiling hydrocarbons within the gasoline boiling range, including the steps of heating the oil to a cracking temperature, separating the heated oil into vapors and unvaporized oil in a separating zone, contacting the vapors with catalytic material in successive reaction zones, passing a compact mass of catalytic material through each of said reaction zones for contact with the vapors passing therethrough, and heating the hydrocarbons intermediate the reaction zones each of said reaction zones being maintained at the desired average reaction temperature by the sensible heat contained in the introduced catalyst and hydrocarbon vapors undergoing conversion.

2. In a process of cracking hydrocarbon oils into lower boiling hydrocarbons within the gasoline boiling range in which a hydrocarbon oil is heated to cracking temperature, flashed into vapors and unvaporized oil in a separating zone, the vapors withdrawn from the separating zone and passed through successive reaction zones in contact with a compact mass of catalytic material, the improvement which comprises continuously passing fresh catalytic material through the reaction zones, and reheating vapors withdrawn from one reaction zone to cracking temperature before their passage to the next reaction zone each of said reaction zones being maintained at the desired average reaction temperature by the sensible heat contained in the introduced catalyst and hydrocarbon vapors undergoing conversion.

3. A method of converting hydrocarbon oil into lower boiling hydrocarbons within the gasoline boiling range including the steps of heating a hydrocarbon oil to cracking temperature, contacting the heated hydrocarbon oil with a moving stream of a compact mass of catalyst in a first reaction zone, withdrawing the hydrocarbon oil from the first reaction zone and reheating it to cracking temperature, and contacting the reheated oil with a moving stream of a compact mass of catalyst in a second reaction zone for a sufficient period of time to effect conversion each of said reaction zones being maintained at the desired average reaction temperature by the sensible heat contained in the introduced catalyst and hydrocarbon vapors undergoing conversion.

4. A process of catalytic conversion of hydrocarbons into lower boiling hydrocarbons within the gasoline boiling range comprising the steps of continuously counterflowing hydrocarbon oil heated to a conversion temperature in a first reaction zone with a compact mass of catalyst, continuously supplying catalyst material to said reaction zone, continuously removing partially spent catalytic material from said reaction zone, withdrawing the reacted hydrocarbon oil from the first reaction zone and reheating it to reaction temperature, continuously counterflowing the reheated hydrocarbon oil at reaction temperature in a second reaction zone with a catalyst material, continuously supplying catalyst material to said second reaction zone, and continuously removing partially spent catalytic material from said second reaction zone each of said reaction zones being maintained at the desired average reaction temperature by the sensible heat contained in the introduced catalyst and hydrocarbon vapors undergoing conversion.

5. A method as in claim 3 wherein the catalytic material supplied to said first reaction zone is that withdrawn from said second reaction zone.

6. A method as in claim 3 in which freshly regenerated and hot catalytic material is supplied to both reaction zones.

7. A method as in claim 3 wherein the catalytic material withdrawn from said first reaction zone is continuously reactivated and recycled directly into said second reaction zone.

8. A method as in claim 3 wherein the catalytic material withdrawn from said first and said second reaction zone is continuously revivified and returned directly to said reaction zones.

9. A method of converting hydrocarbon oil by an endothermic catalytic reaction, including the steps of heating a hydrocarbon oil to a conversion temperature, contacting the heated hydrocarbon oil with a moving bed of catalyst particles in a first reaction zone, withdrawing the hydrocarbon oil from the first reaction zone and reheating it to conversion temperature, and contacting the reheated oil with a moving bed of catalyst particles in a second reaction zone for a sufficient period of time to effect conversion, each of said reaction zones being maintained at the desired average conversion temperature by the sensible heat contained in the introduced catalyst and hydrocarbon vapors undergoing conversion.

10. A method of converting hydrocarbon oil by an endothermic catalytic reaction, including the steps of contacting hydrocarbon oil with a moving bed of catalyst particles in a first reaction zone maintained at conversion temperature, withdrawing the hydrocarbon oil from the first reaction zone, reheating and contacting hydrocarbon oil thus withdrawn from the first reaction zone with a moving bed of catalyst particles in a second reaction zone for a sufficient period of time to effect further conversion thereof, each of said reaction zones being maintained at the desired average conversion temperature by the sensible heat contained in the introduced catalyst and hydrocarbon vapors undergoing conversion.

11. A method of converting hydrocarbon oil by an endothermic catalytic reaction, including the steps of heating hydrocarbon oil to an elevated temperature, contacting the heated oil with a moving bed of catalyst particles in a first reaction zone, withdrawing the hydrocarbon oil from the first reaction zone and reheating hydrocarbon oil thus withdrawn to an elevated temperature, and contacting the reheated oil with a moving bed of catalyst particles in a second reaction zone for a sufficient period of time to effect conversion thereof, each of said reaction zones being maintained at the desired average conversion temperature by the sensible heat contained in the introduced catalyst and hydrocarbon vapors undergoing conversion.

12. A process as defined in claim 11 wherein the used catalyst continuously withdrawn from both of said reaction zones is passed to a common regeneration zone and the regenerated catalyst is continuously withdrawn from said regeneration zone and returned directly to said reaction zones, a portion thereof being returned directly to the first reaction zone and a second portion directly to the second reaction zone.

13. A method of converting hydrocarbon oil into lower boiling hydrocarbons within the gasoline boiling range including the steps of contacting hydrocarbon oil with a bed of catalyst particles circulated through a first reaction zone maintained at conversion temperature, withdrawing hydrocarbon oil from the first reaction zone and reheating hydrocarbon oil thus withdrawn to an elevated temperature, and contacting the reheated oil with a bed of catalyst particles circulated through a second reaction zone, for a sufficient period of time to effect conversion thereof, each of said reaction zones being maintained at the desired average conversion temperature by the sensible heat contained in the introduced catalyst and hydrocarbon vapors undergoing conversion, the catalytic material continuously supplied to one of said zones being that continuously withdrawn from the other reaction zone.

WILLIAM J. DEGNEN.
HENRY M. NELLY, JR.
PERCIVAL C. KEITH, JR.